United States Patent [19]

Walters

[11] Patent Number: 5,161,808
[45] Date of Patent: Nov. 10, 1992

[54] COLLAPSIBLE SEALING GASKET

[75] Inventor: David H. Walters, Menomonee Falls, Wis.

[73] Assignee: Great Gasket Concepts, Inc., Menomonee Falls, Wis.

[21] Appl. No.: 654,296

[22] Filed: Feb. 12, 1991

[51] Int. Cl.$^5$ .............................................. F16J 15/00
[52] U.S. Cl. .................................... 277/199; 277/192;
277/221; 277/235 B; 403/295; 403/401
[58] Field of Search ............... 277/192, 199, 220, 221,
277/222, 235 B; 403/295, 401; 16/221, 225

[56] References Cited

U.S. PATENT DOCUMENTS

| 1,986,465 | 1/1935 | Dempsey | 277/199 |
| 3,231,789 | 1/1966 | Carrell | 277/199 |
| 3,438,117 | 4/1969 | Engleman | 277/199 |
| 3,583,711 | 6/1971 | Engleman | 277/199 |
| 3,738,670 | 6/1973 | Jelinek et al. | 277/199 |
| 4,293,135 | 10/1981 | Wallace | 277/199 |
| 4,357,744 | 11/1982 | McKenzie et al. | 403/295 |
| 4,704,838 | 11/1987 | Wendt | 403/401 |

FOREIGN PATENT DOCUMENTS 2529066 12/1983 France ............................ 403/401

Primary Examiner—William A. Cuchlinski, Jr.
Assistant Examiner—Daniel G. DePumpo
Attorney, Agent, or Firm—Andrus, Sceales, Starke & Sawall

[57] ABSTRACT

A collapsible planar sealing gasket includes a number of longitudinally extending sections disposed in an end-to-end relationship with each longitudinal section being integrally and continuously joined to an adjacent longitudinally extending section by a corner portion that has an arcuate cut in the gasket material extending from one longitudinal section to an adjoining longitudinal section so as to define a rounded portion of gasket material which allows the bending of the gasket material between a collapsed and an operable position.

6 Claims, 1 Drawing Sheet

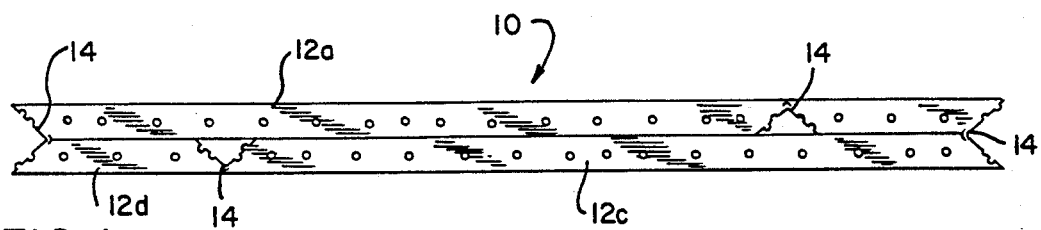
FIG. 1
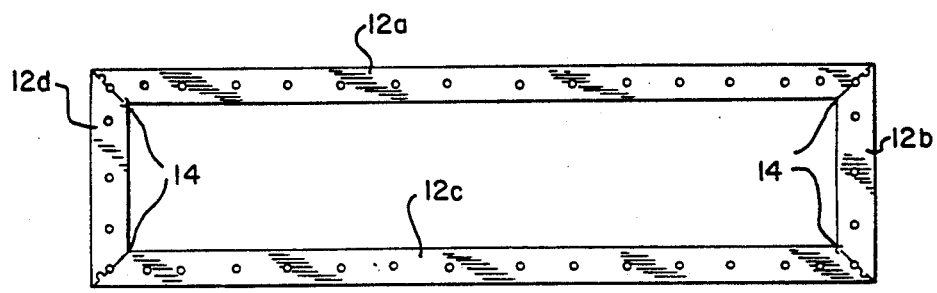
FIG. 2
FIG. 3
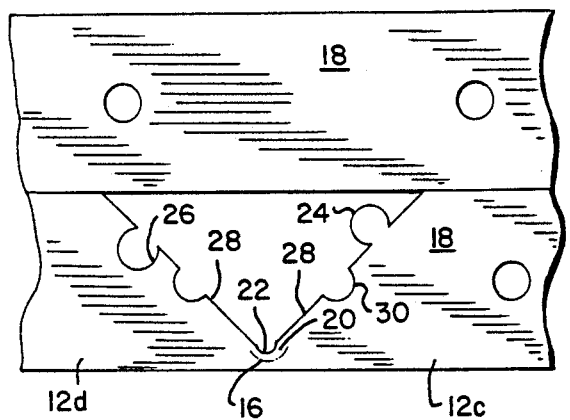
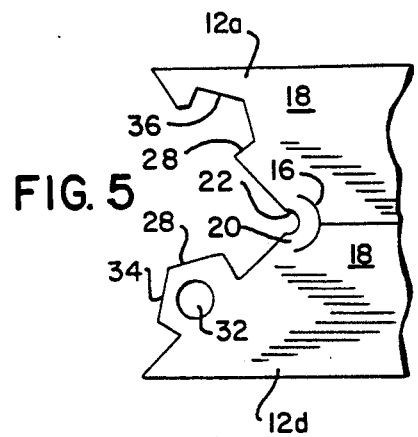
FIG. 5
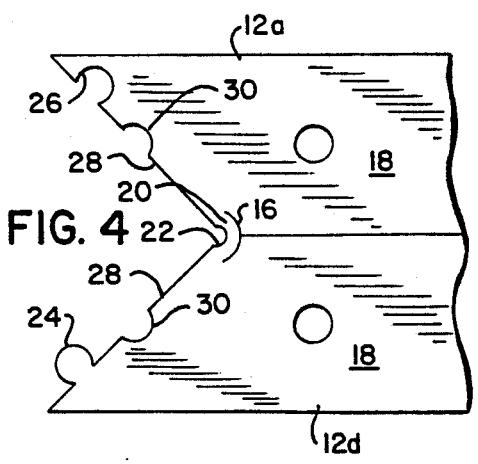
FIG. 4
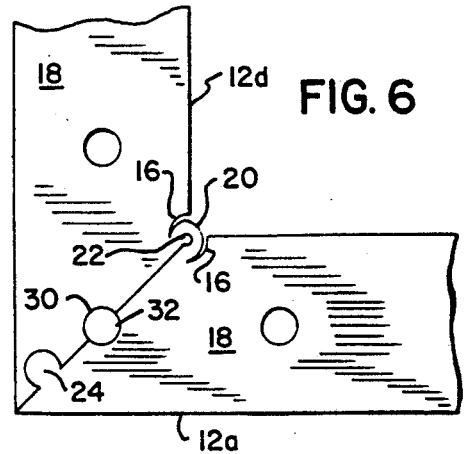
FIG. 6

COLLAPSIBLE SEALING GASKET

BACKGROUND OF THE INVENTION

The present invention relates to a sealing gasket and more particularly to a collapsible sealing gasket that can be moved from a collapsed position to an operable position.

In the past, sealing gaskets have either been stamped from a sheet of gasket material or made in a collapsible form such as that shown in U.S. Pat. No. 3,583,711. Gaskets stamped from a sheet of gasket material have required many parts and steps in the manufacturing operation and have utilized substantial quantities of material with substantial waste. Collapsible gaskets made in accordance with the '711 patent have solved the material waste problem, but the corner joints connecting the gasket sections were delicate and often broke when the gasket was moved from its collapsed to its operable position.

It is an object of the present invention to provide a collapsible gasket which not only solves the material waste problem but also which provides a unique corner configuration that allows the gasket to be moved between collapsed and operable positions a number of times without deterioration or breaking of the corner connections.

SUMMARY OF THE INVENTION

A collapsible planar sealing gasket includes a plurality of longitudinally extending sections that are disposed in an end-to-end relationship.

In accordance with one aspect of the invention, each longitudinally extending section is integrally and continuously joined to an adjacent longitudinally extending section by a corner portion so that the longitudinal sections may be moved between a collapsed position and an operable position.

In accordance with yet another aspect of the invention, the corner portions have an arcuate cut in the gasket material that extends from one longitudinal section to an adjoining longitudinal section so as to define a rounded portion of gasket material that allows the bending of the gasket material between the collapsed and the operable positions.

In accordance with still another aspect of the invention, the rounded portion of gasket material is provided with a substantially centered cut-out that facilitates the bending of the gasket material.

The present invention thus provides a collapsible sealing gasket which may be manufactured with a substantial savings in gasket material and which is provided with a corner portion that permits the gasket to be moved numerous times between the collapsed position and the operable position without deterioration or breaking of the corner joint.

BRIEF DESCRIPTION OF THE DRAWINGS

The drawings illustrate the best mode contemplated for carrying out the invention.

In the drawings:

FIG. 1 is a plan view of a sealing gasket constructed according to the present invention and in its collapsed position;

FIG. 2 is a plan view of the sealing gasket of FIG. 1 in its operable position;

FIG. 3 is an enlarged plan view of a corner portion of the sealing gasket of FIG. 1;

FIG. 4 is an enlarged plan view of a corner portion of the sealing gasket adjacent the corner portion shown in FIG. 3;

FIG. 5 is an enlarged view of an alternate embodiment of a corner portion of the sealing gasket of FIG. 1; and FIG. 6 is an enlarged view of a corner portion of the sealing gasket of FIG. 1 in its operable position.

DETAILED DESCRIPTION OF THE INVENTION

As shown in FIG. 1, a collapsible planar sealing gasket 10 in its collapsed state includes a number of longitudinally extending sections 12a through 12d disposed in an end-to-end relationship. Each of longitudinal sections 12a through 12d is integrally and continuously joined to an adjacent longitudinal section by corner portion 14 that allows for the pivotal movement of longitudinal sections 12a through 12d about corner portions 14 so that the longitudinal sections 12a through 12d may be moved between the collapsed position shown in FIG. 1 and the operable position shown in FIG. 2.

As seen in FIGS. 4 through 6, corner portion 14 includes an arcuate cut 16 in gasket material 18. The arcuate cut extends from one longitudinal section to an adjoining longitudinal section, e.g. 12c through 12d. Arcuate cut 16 defines a rounded portion of gasket material 20 that facilitates the bending of gasket material 18 and provides stability in the bending area. Rounded portion 20 is further provided with a substantially centered circular cut-out 22 that also facilitates the bending of gasket material 18 in corner portion 14.

Sealing gasket 10 is also provided with locking means in the form of a circular prong 24 and a circular recess 26 disposed along edge portions 18 of longitudinal sections 12a through 12d. When longitudinal sections 12a through 12d are moved into their operable position, edge portions 28 abut and circular prong 24 will be received by circular recess 26 so as to maintain longitudinal sections 12a through 12d in their operable position.

Edge portions 28 are also provided with semicircular cut-outs 30 that define a circular opening 32 when longitudinal sections 12a through 12d are moved to their operable positions and edge portions 28 abut. Openings 32 accept a fastener (not shown) which is used to secure gasket 10 to a surface.

FIG. 5 illustrates an alternate embodiment in which the locking means is in the form of a multi-sided prong 34 that is accepted by multi-sided recess 36. Sometimes in assembling gasket 10, an adhesive is applied along edge portions 28 to maintain longitudinal sections 12a through 12d in their operable position and it has been found that the embodiment shown in FIG. 5 provides additional contact surface along edge 28 and thus, an enhanced connection at the corner.

In the embodiment shown in FIG. 5, the fastener receiving opening 32 is disposed within prong 34.

Various modes of carrying out the invention are contemplated as being within the scope of the following claims particularly pointing out and distinctly claiming the subject matter regarded as the invention.

I claim:

1. A collapsible, planar sealing gasket comprising in its collapsed state, a plurality of longitudinally extending sections disposed in end-to-end relationship, each longitudinally extending section being integrally and continuously joined to an adjacent longitudinally extending section by a corner portion only to allow pivotal movement of said longitudinal sections about said corner portion whereby said longitudinal sections may be moved between a collapsed position and an operable position in which pairs of said longitudinal sections are connected at substantially right angles and define a parallelogram with diagonal seam lines extending from the outer edge of the gasket inwardly, said corner portion having an arcuate cut in the gasket material extending from one longitudinal section to an adjoining longitudinal section, said arcuate cut defining a rounded portion of gasket material disposed at the inner end of said seam line to allow the bending of said gasket material between said collapsed and operable positions said rounded portion having a substantially centered circular cut-out to facilitate the bending of said gasket material.

2. The sealing gasket defined in claim 1 further comprising locking means disposed on said longitudinal sections to maintain said longitudinal sections in said operable position.

3. The sealing gasket defined in claim 2 wherein each of said longitudinal sections has an edge portion that abuts with a corresponding edge portion of an adjacent longitudinal portion when said sections are moved to said operable position and said locking means comprises a prong portion extending from said edge of one of said longitudinal sections and a recess for accepting said prong disposed in said edge of the other of said longitudinal sections.

4. The sealing gasket defined in claim 3 wherein said prong and said recess are substantially circular in shape.

5. The sealing gasket defined in claim 1 wherein each of said longitudinal sections has an edge portion that abuts with a corresponding edge portion of an adjacent longitudinal portion when said sections are moved to said operable position and wherein each of said edge portions is provided with a cut-out that cooperates with a cut-out in the edge of an adjoining longitudinal section to define an opening for a fastener used to secure the gasket to a surface.

6. The sealing gasket defined in claim 5 wherein said cut-outs cooperate to define a substantially circular opening.

* * * * *